US010698288B2

(12) United States Patent
Miyazaki et al.

(10) Patent No.: US 10,698,288 B2
(45) Date of Patent: Jun. 30, 2020

(54) OPTICAL MODULATOR

(71) Applicant: Sumitomo Osaka Cement Co., Ltd., Tokyo (JP)

(72) Inventors: Norikazu Miyazaki, Tokyo (JP); Toru Sugamata, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 15/884,491

(22) Filed: Jan. 31, 2018

(65) Prior Publication Data

US 2018/0217467 A1    Aug. 2, 2018

(30) Foreign Application Priority Data

Jan. 31, 2017   (JP) ................................. 2017-014986

(51) Int. Cl.
*G02F 1/225*   (2006.01)
*G02F 1/03*    (2006.01)
*H04B 10/516*  (2013.01)
*H04B 10/50*   (2013.01)

(52) U.S. Cl.
CPC ............ *G02F 1/225* (2013.01); *G02F 1/0316* (2013.01); *H04B 10/5161* (2013.01); *H04B 10/5053* (2013.01)

(58) Field of Classification Search
None
See application file for complete search history.

(56) References Cited

U.S. PATENT DOCUMENTS

| 10,061,179 | B2 * | 8/2018 | Miyazaki | G02F 1/2255 |
| 10,571,722 | B2 * | 2/2020 | Miyazaki | G02F 1/0121 |
| 2001/0054688 | A1 * | 12/2001 | Waki | H01J 49/063 250/294 |
| 2003/0015718 | A1 * | 1/2003 | Nakanishi | G02B 6/4246 257/81 |
| 2004/0105681 | A1 * | 6/2004 | Nakanishi | G02B 6/4206 398/141 |
| 2007/0264851 | A1 * | 11/2007 | Honda | H01R 12/57 439/157 |
| 2008/0203510 | A1 * | 8/2008 | Kawamura | H01L 31/0203 257/433 |
| 2009/0168823 | A1 * | 7/2009 | Kamei | G11B 7/127 372/38.04 |
| 2009/0176402 | A1 * | 7/2009 | Honda | H01R 4/02 439/377 |

(Continued)

FOREIGN PATENT DOCUMENTS

JP    H07142835 A    6/1995
JP    2001267474 A   9/2001

(Continued)

*Primary Examiner* — Tina M Wong
(74) *Attorney, Agent, or Firm* — IpHorgan Ltd.

(57) ABSTRACT

Provided is an optical modulator in which an optical modulation element is accommodated in a housing. A plurality of lead pins, which are electrically connected to the optical modulation element through wire bonding, are fixed to the housing in a manner of protruding at least a part of each of the plurality of lead pins into the housing. In the plurality of lead pins, lengths of the lead pins are set to be different from each other so that a natural frequency of at least partial lead pins is different from a natural frequency of the other lead pins.

3 Claims, 9 Drawing Sheets

(56) References Cited

U.S. PATENT DOCUMENTS

| | | | | |
|---|---|---|---|---|
| 2010/0006863 A1* | 1/2010 | Ban | ................. | H01L 31/0203 257/81 |
| 2014/0246783 A1* | 9/2014 | Nishizawa | ............ | H01L 25/072 257/774 |
| 2015/0116809 A1 | 4/2015 | Uto et al. | | |
| 2015/0334834 A1* | 11/2015 | Otomaru | ................ | H01L 23/15 174/257 |
| 2016/0035646 A1* | 2/2016 | Soyano | .................. | H01L 21/52 257/692 |
| 2017/0212402 A1* | 7/2017 | Ishii | ..................... | H01R 12/592 |
| 2017/0336584 A1* | 11/2017 | Ariga | ....................... | H05K 1/02 |
| 2018/0106835 A1* | 4/2018 | Tong | .................. | G01R 1/0466 |
| 2018/0217467 A1* | 8/2018 | Miyazaki | ............... | G02F 1/225 |

FOREIGN PATENT DOCUMENTS

| | | | |
|---|---|---|---|
| JP | 2003338520 A | 11/2003 |
| JP | 2014195061 A | 10/2014 |
| JP | 2015088641 A | 5/2015 |

\* cited by examiner

OPTICAL MODULATOR

CROSS-REFERENCE TO RELATED APPLICATIONS

This application claims the benefit of Japanese Patent Application No. 2017-014986 filed Jan. 31, 2017, the disclosure of which is herein incorporated by reference in its entirety.

BACKGROUND OF THE INVENTION

Field of the Invention

The present invention relates to an optical modulator, and particularly to, an optical modulator such as a dual polarization-quadrature phase shift keying (DP-QPSK) modulator that includes a plurality of lead pins.

Description of Related Art

In an optical communication field, an optical transmission apparatus on which a high-frequency optical modulator is mounted has been used. In recent years, a demand for high capacity and miniaturization of the optical transmission apparatus has increased. With regard to the high capacity of the optical transmission apparatus, an optical modulator, in which transmission capacity is further enhanced by changing a modulation form from intensity modulation (on-off keying) and the like in the related art into a transmission format such as QPSK, DP-QPSK, and the like which use phase modulation and to which multi-level modulation or polarization multiplexing is introduced, has been realized.

For example, in a case of a DP-QPSK modulator, four RF input units which input radio frequency signals (RF signals) and four optical modulator units which perform modulation in correspondence with the input signals are integrated in one optical element, thereby realizing small-size and high-capacity transmission. As a substrate of an optical modulation element, recently, a substrate using Si in addition to materials such as $LiNbO_3$ and InP, and the like are known.

As illustrated in FIG. 1, an optical modulator includes a signal input unit for a bias control of a plurality of optical modulator units formed on an optical modulation element and a plurality of lead pins as output units of a monitor PD (photo detector) that generates an electrical signal that is used to perform the bias control in addition to the RF input units. For example, as a DP-QPSK modulator in which four RF input units, four optical modulator units, and two monitor PDs for feedback are integrated, a DP-QPSK, which includes 18 lead pins including a ground pin or a not connect (NC) pin, is known. The lead pins are mainly used to input or output a DC signal. Furthermore, the necessary minimum number of the lead pins is not 18, and the number of the lead pins varies in accordance with presence or absence of a DC bias electrode or the ground pin, and the like. In a typical case, the number of pins, arrangement of the pins, and the like are standardized through business groups who manufacture or use the optical modulator.

As a configuration which includes the plurality of lead pins as described above, a multi-pin configuration such as butterfly pins of a semiconductor LD (semiconductor laser) housing is generally used. The plurality of lead pins are air-tightly sealed by embedding a ceramic substrate, on which an electrical interconnection or a bonding pad is patterned, in a hole formed in the housing, and fixing the ceramic substrate by using a brazing material and the like.

In addition, a lead pin for substrate connection is fixed to the outside of the housing by using a brazing material or solder, and an optical element and an interconnection pattern on the ceramic substrate are electrically connected by using wire bonding on an inner side of the housing.

The butterfly pin configuration has an advantage that a multi-pin configuration can be realized in a small-size and high-accuracy manner, and in a high-density manner. However, the butterfly pin configuration has a disadvantage such things as increasing in size is difficult from the viewpoint of reliability due to a difference in a thermal expansion coefficient between a metal housing and a ceramic material (occurrence of ceramic substrate cracking or air-tight sealing leakage due to a temperature variation), increasing in the manufacturing cost, and the like. According to this, the butterfly pin is not used in a relatively large-sized DP-QPSK modulator that uses $LiNbO_3$ as a material, and the like. In the DP-QPSK modulator and the like, a lead pin configuration in which air-tight sealing is possible at a relatively low cost is used instead of the butterfly pin. In the lead pin configuration, a lead pin inserted into a hole, which passes through a lateral surface of the housing, is fixed by using a glass sealing material.

An electrical signal having a frequency component of DC to approximately MHz may be applied to the lead pin that is used in the optical modulator, but a low-frequency electrical signal, which is lower in comparison to a high-frequency RF connector, is applied to the lead pin. Therefore, a configuration, in which the freedom of design is high and can be simply realized in such a manner that the pins are penetrated through the housing and are fixed thereto, is employed. The lead pin configuration enters the following hollow state in which at least a part of a lead pin is protruded into the housing differently from the butterfly pin configuration of the semiconductor LD housing. Wire bonding for electrical connection is directly performed with respect to the lead pins. For example, Japanese Laid-open Patent Publication No. 2014-195061 discloses an electronic apparatus having a structure in a hollow state in which at least a part of a lead pin is protruded into the housing.

Generally, the number of the lead pins, an interval between the lead pins, and the like are determined in accordance with the standard in respective industries. However, it is difficult to design and form interconnection pad portions on an optical modulation element side at an interval conforming to the standard due to various design restrictions. Accordingly, typically, a relay substrate is provided between electrode pad portions of the optical modulation element and the lead pins to easily perform connection between the lead pins and pad portions of the relay substrate, and connection between the electrode pad portions of the optical modulation element and the pad portions of the relay substrate.

In wire bonding connection, typically, ultrasonic vibration is applied during thermal compression so as to enhance connection strength and reproducibility of connection stability for short connection time. The function is introduced the majority of wire bonding apparatuses. For example, Japanese Laid-open Patent Publication No. 2003-338520 discloses a wire bonding apparatus in which an excitation frequency of capillary is set to a frequency different from a natural frequency of a wire.

SUMMARY OF THE INVENTION

It is demanded for connection strength of the wire bonding (a gold wire in many cases) to have sufficient connection reliability with respect to external trouble causes which may occur during assembly, transportation, installation, and operation of the optical modulator or the optical transmission apparatus. Accordingly, a jig for bonding connection condition presentation and the like are prepared in advance by the same material and in the same design as in the lead pins which are subjected bonding connection, and wire bonding conditions (a heating temperature, application power, application time, application weight, and the like) are determined.

In addition, typically, application of ultrasonic vibration is performed in addition to thermal compression of a wire for an improvement of connection strength, an improvement of stabilization and reproducibility of the connection strength, and the like in the wire bonding. A frequency of ultrasonic waves which are applied is different depending on the kind of apparatuses and an apparatus maker, and is approximately 30 kHz to 200 kHz.

The wire bonding conditions are set so that connection strength of a bonded wire becomes a value having a sufficient tolerance with respect to necessary minimum limit connection strength ($g_{min}$) in consideration of a connection strength distribution. For example, in a case where the limit connection strength $g_{min}$ required for the optical modulator is set to 2 g, the conditions are set so that average connection strength $g_0$ becomes 6 g that is three times of 2 g, and a design safety tolerance in consideration of the connection strength distribution becomes 4 g that is two times of 2 g.

The conditions are appropriately changed in accordance with various factors such as a diameter of a gold wire, a material or a surface state of an object to be bonded, an environment (the inside of a communication station, outdoors, the inside of an aircraft, the inside of a rocket, or the inside of a satellite) to which the optical modulator is adapted, and an adaptation reliability standard.

After the conditions having a sufficient tolerance are determined, if a material or a shape of a lead pin to be bonded, a housing fixing configuration, an apparatus that is used, and the like are the same in each case, even when performing wire bonding in a housing having a different design under the same conditions, connection having sufficient connection reliability is possible. However, the possibility is realized on the assumption that maintenance is made on the wire bonding apparatus for daily inspection, and thus main causes for apparatus failure and the like are removed.

In this situation, even in an existing DP-QPSK modulator, a demand for further miniaturization and large capacity has strongly increased. According to this, an examination on further miniaturization of the housing through introduction of various methods is in progress. Examples of the methods include a method in which an RF input unit is changed from a push-on type connector in the related art to a flexible printed circuit (FPC) and the like, a method in which miniaturization of polarization-combining part is attempted, a method in which miniaturization of the optical modulation element is attempted, and the like.

However, with regard to the small-sized DP-QPSK modulator and the like, when using wire bonding in which sufficient connection reliability is obtained and the results of mass production are sufficiently accumulated in the related art, it was found that bonding having connection strength lower than limit connection strength occurs in some cases. The bonding failure may occur in some cases even when performing wire bonding in a state in which a material and a shape of a lead pin to be bonded, a housing fixing configuration, and an apparatus that is used are the same in each case, and wire bonding conditions are the same in each case.

In a case where bonding having connection strength lower than the limit connection strength exists, there is a possibility of occurrence of a phenomenon (wire peeling-off) in which a wire is peeled-off from a lead pin. If the wire peeling-off occurs during operation of an optical communication system, serious failure, which leads to catastrophic failure in which the operation stops at a time, may occur as a significant influence.

In addition, an attempt for increasing transmission capacity by integrating a plurality of DP-QPSK modulation elements in one housing is also in progress from now on. According to this, the number of lead pins provided in the optical modulator further increases, and thus it is important to secure connection reliability.

It can be seen that the bonding having connection strength lower than the limit connection strength occurs due to a cause other than causes such as failure of the wire bonding apparatus and a connection surface state of the lead pin to be bonded. In addition, it can be seen that strength as in the related art is obtained as the connection strength with respect to a single lead pin. However, it was not clear why the problem occurs.

This phenomenon is newly manifested without being shown in the optical modulator of the related art, and becomes a serious problem of deteriorating reliability of the optical modulator as the basis of optical communication.

An object of the invention is to suppress deterioration of connection strength in wire bonding with respect to lead pins in an optical modulator including a plurality of the lead pins which are fixed to a housing in a manner of protruding at least a part of each of the plurality of lead pins into the housing.

To accomplish the object, an optical modulator of the invention has the following technical characteristics.

(1) According to an aspect of the invention, there is provided an optical modulator including an optical modulation element that is accommodated in a housing. A plurality of lead pins, which are electrically connected to the optical modulation element through wire bonding, are fixed to the housing in a manner of protruding at least a part of each of the plurality of lead pins into the housing, and a natural frequency of at least partial lead pins among the plurality of lead pins is different from a natural frequency of the other lead pins.

(2) In The optical modulator according to (1), the plurality of lead pins may be arranged at approximately even intervals, and a natural frequency may be different between at least adjacent lead pins.

(3) In the optical modulator according to (1), among the plurality of lead pins, a plurality of lead pins which are continuously arranged may be integrated to form a unit, an interval between respective units may be greater than an interval between lead pins in one unit, and a natural frequency of lead pins in at least partial units may be different from a natural frequency of lead pins in other units, or a natural frequency of at least partial lead pins in one unit may be different from a natural frequency of the other lead pins in the unit.

(4) In the optical modulator according to any one of (1) to (3), the partial lead pins may be different from the other lead pins in at least one of a length, a boldness, a width, a thickness, a cross-sectional shape, a material, and a position at which a shape locally varies.

According to the aspect of the invention, it is possible to reduce resonance of other lead pins (particularly, lead pins for which wire bonding is completed) due to vibration that occurs during wire bonding with respect to a lead pin, and thus it is possible to suppress deterioration of connection strength in wire bonding with respect to the lead pins.

DETAILED DESCRIPTION OF THE INVENTION

Description will be given of an optical modulator according to the invention, and an optical transmission apparatus on which the optical modulator is mounted. Furthermore, the invention is not limited to by examples illustrated in the following embodiment.

First, description will be given of an overview of an example of the related art with reference to the accompanying drawings.

Figure 1:
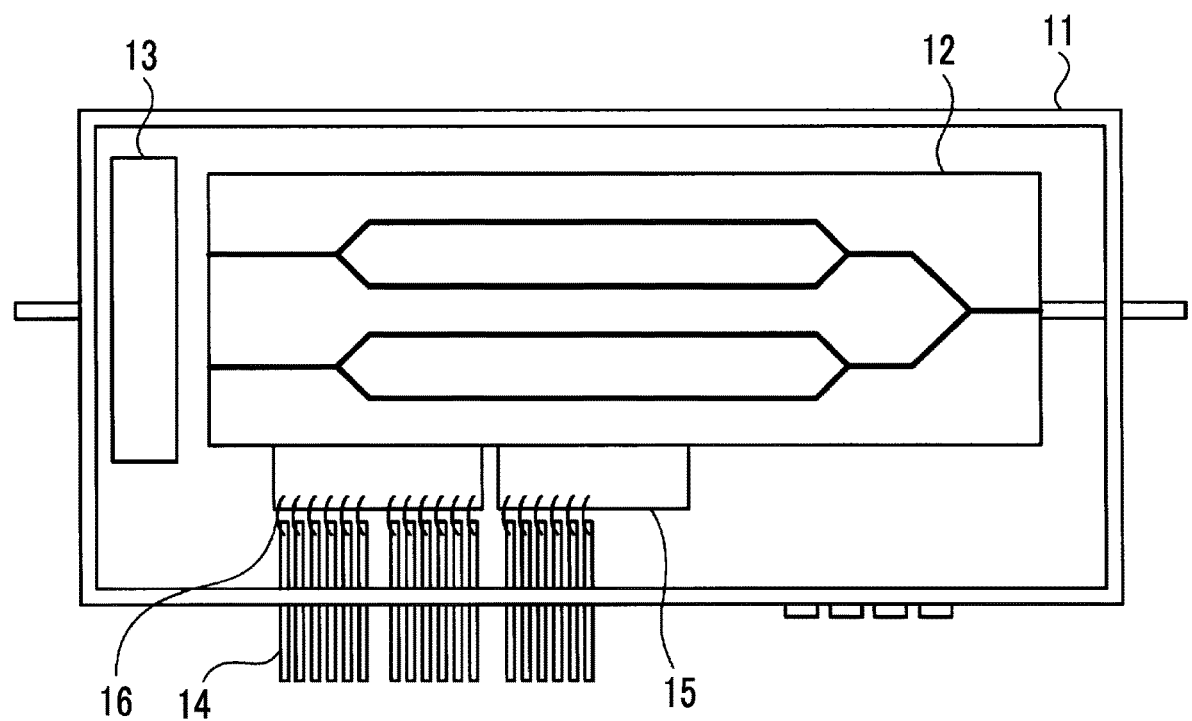
FIG. 1 is a view illustrating a configuration example of a DP-QPSK modulator in the related art.

FIG. 1 is a top view illustrating a configuration example of a DP-QPSK modulator of the related art. The DP-QPSK modulator in the same drawing has a structure in which an optical modulation element 12 in which an optical waveguide is formed in an optical element substrate, and a polarization-combining part 13 that combines a light wave modulated in the optical modulation element are mounted in a housing 11. Furthermore, an electrode that is used in optical modulation, an optical component for polarization combining, an RF input signal line inside a housing, and the like are not illustrated. As the optical element substrate in which the optical waveguide is formed, a substrate that uses $LiTaO_3$, InP, Si, and the like is used in addition to a substrate that uses $LiNbO_3$.

In a case of the DP-QPSK modulator, four sub-Mach-Zehnder optical waveguides are formed in the optical element substrate, and four high-frequency signal electrodes (not illustrated) configured to apply a modulation signal to each of the sub-Mach-Zehnder optical waveguides are formed. In correspondence with the configuration, a plurality of lead pins such as a DC lead pin for adjustment of a bias point and a PD signal lead pin for detection of a bias point with respect to each of the sub-Mach-Zehnder optical waveguides are necessary, and each of the lead pins are led out from a lateral surface of the housing.

An interval between the lead pins is determined in conformity to standards in many cases. Typically, the lead pins are arranged at a constant interval. However, it is very difficult to design electrodes pad on an optical modulation element side at the same position and interval as those of the lead pins due to various design factors and restrictions. Accordingly, as illustrated in FIG. 1, typically, a relay substrate 15, which relays electrode pad portions of the optical modulation element 12 and the lead pins 14, is provided. Furthermore, although not illustrated, in the relay substrate 15, pad portions with respect to the lead pins 14 and pad portions with respect to the electrode pad portions of the optical modulation element 12 are designed to face and to be adjacent to each other so as to enhance production efficiency. This configuration is employed to shorten a wire bonding length as much as possible, and to realize bonding in the same shape as much as possible in a range in which reliability is secured.

Figure 2:
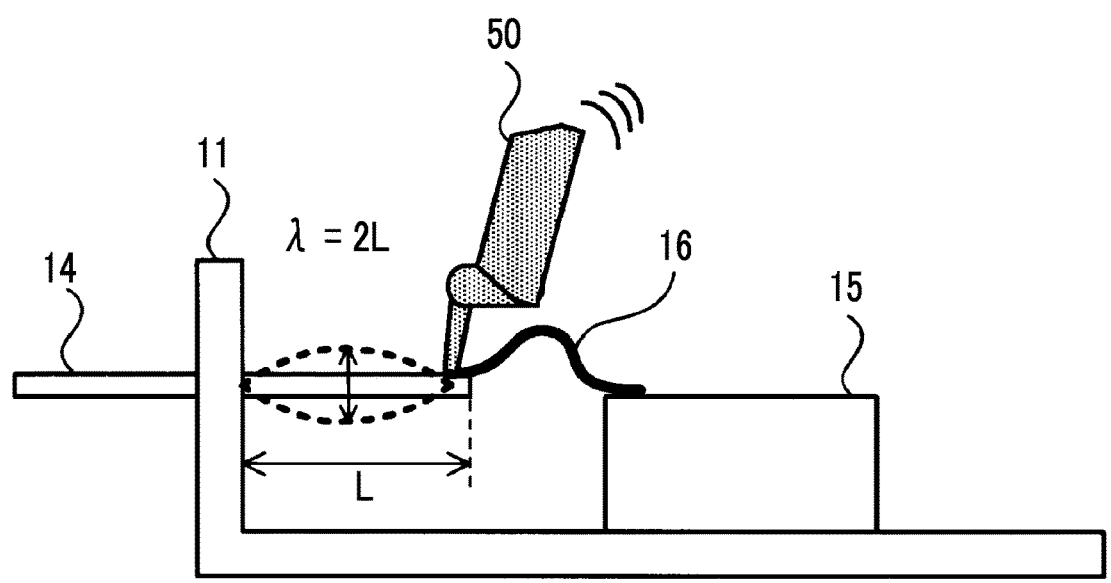
FIG. 2 is a view illustrating wire bonding with respect to a lead pin.

FIG. 2 is a view illustrating wire bonding with respect to each of the lead pins.

The lead pins 14 which pass through the housing 11 are fixed to the housing 11 with a glass sealing material by a fixing method of realizing both air-tight sealing and electrical insulation. Each of the lead pins 14 in this state has a configuration in which at least a part of the lead pin 14 is protruded into the housing, that is, only one end is fixed, and bonding of an electrical connection wire 16 is performed in the vicinity of a leading end.

Examples of the kind of the wire bonding include ball bonding and wedge bonding, and application of a pressure and ultrasonic waves is performed in a heated stated. Due to an ultrasonic thermal compression operation, wire bonding, in which connection strength is secured and a variation of connection reproducibility and connection strength is suppressed, is performed.

This is true of wire bonding with respect to the lead pins having the configuration in which at least a part of each of the lead pins is protruded into the housing. In a case of the lead pins having the configuration in which at least a part of each of the lead pins is protruded into the housing, in the wire bonding with respect to the tip end (end that is not fixed to the housing), an unstable impression apparently exists. However, when appropriately selecting bonding conditions (a temperature, ultrasonic power, a compression pressure, time, a wire material, a wire diameter, and the like), it is possible to realize the same satisfactory bonding as in wire bonding with respect to a connection pad and the like which are formed on a substrate.

It was found that the satisfactory bonding is obtained mainly in a case where the lead pins do not enter a state of resonating due to ultrasonic waves of a wire bonding apparatus during wire bonding, or in a case where the lead pins enter a resonance state in which a bonding portion and a housing fixing portion are set as both fixing ends.

FIG. 2 illustrates a resonance state, in which a frequency is the lowest, in other words, a resonance wavelength is the longest, in the resonance state in which the bonding portion and the housing fixing portions are set as both fixing ends. That is, when a length of a portion, which protrudes into the housing, of the lead pin 14 is set as L, the above-described resonance state corresponds to a case where a resonance wavelength λ becomes 2L. A portion at which a bonding tool of a wire bonding apparatus 50 comes into contact with the lead pin 14 operates as a fixing end. In a state in FIG. 2, vibration of the bonding portion is small even when the lead pin resonates, and sufficient connection reliability can be obtained through thermal compression by wire bonding and connection by ultrasonic waves in the related art.

Figure 3:
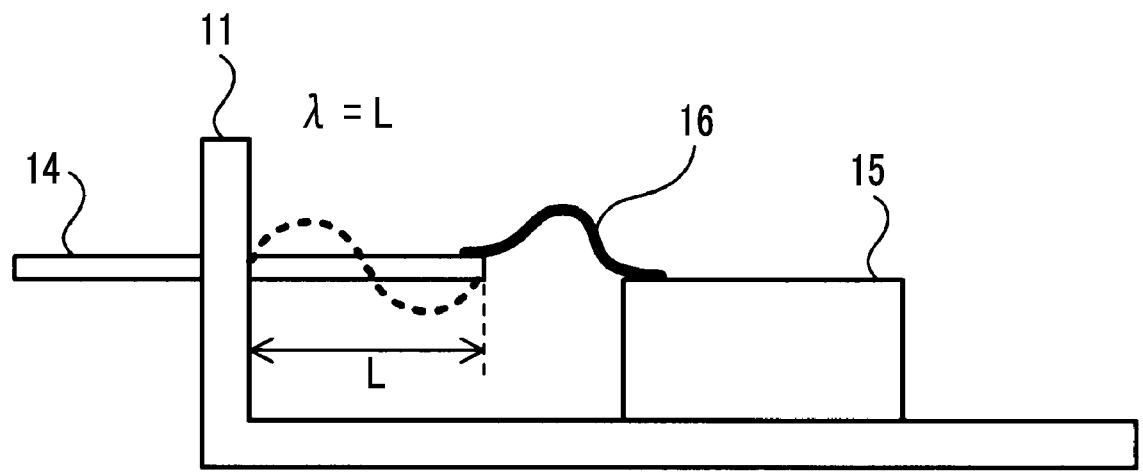
FIG. 3 is a view illustrating an example of a resonance state of the lead pin.

FIG. 3 illustrates a resonance state at a harmonic frequency (in other words, a harmonic wavelength) higher than the frequency in the resonance illustrated in FIG. 2 by one step in the resonance state by the same fixing ends as in FIG. 2. As described above, even in the same lead pin configuration and in the same resonance mode, it can be understood that the resonance frequency includes a plurality of resonance frequency when a harmonic component is added thereto.

Figure 4:
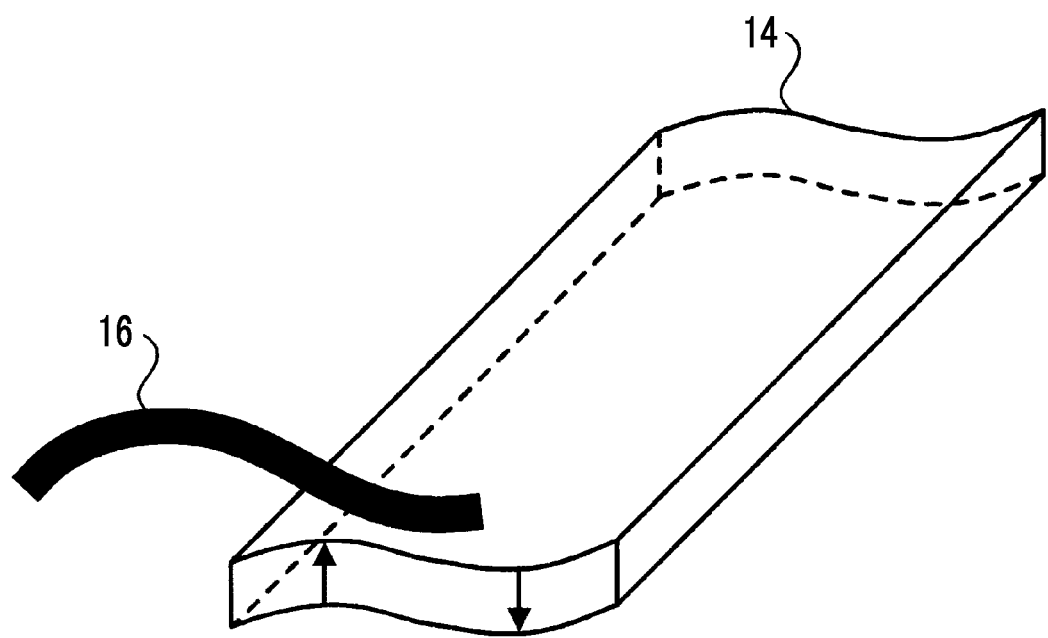
FIG. 4 is a view illustrating another example of the resonance state of the lead pin.

Examples of the resonance mode include not only a resonance mode (also referred to as a vertical resonance mode) in a direction perpendicular to a housing bottom surface as illustrated in FIG. 2 and FIG. 3, but also a resonance mode (also referred to as a horizontal resonance mode) in a direction horizontal to the housing bottom surface. In a case where a cross-sectional shape of the lead pin is a circular shape, a frequency of the vertical resonance mode and a frequency of the horizontal resonance mode are approximately the same as each other. However, as in a flat pin, in a case where the cross-sectional shape is a rectangular shape, a trapezoidal shape, a triangular shape, an elliptical shape, and the like, a basic resonance frequency is different between the vertical resonance mode and the horizontal resonance mode, and a harmonic resonance frequency is also different therebetween. In addition, in a case where the cross-sectional shape is a rectangular shape, as illustrated in FIG. 4, a resonance mode in a cross-sectional direction may also occur, and as a result, a plurality of resonance modes and a plurality of harmonic resonance frequencies may occur.

Figure 5:
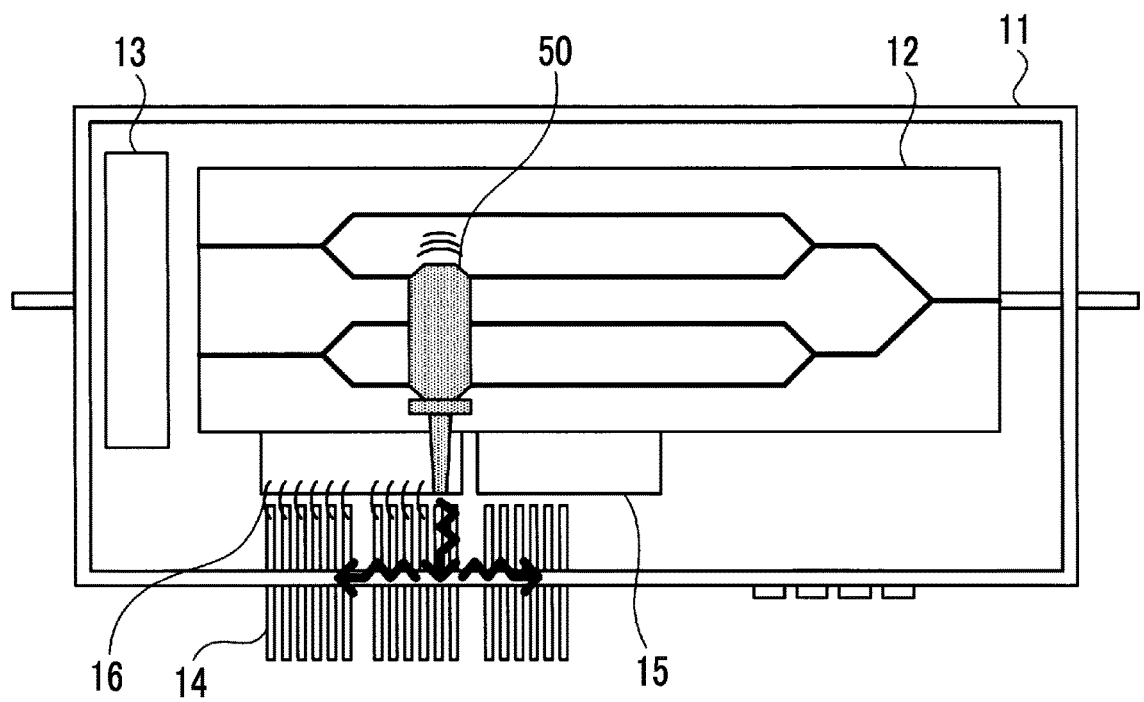
FIG. 5 is a view illustrating propagation of vibration due to the wire bonding.

FIG. 5 is a view illustrating an aspect in which vibration energy due to the above-described various kinds of resonance and the like propagates to other lead pins through a housing lateral surface to which lead pins in wire bonding are fixed, and causes the other lead pins to vibrate. In a case where lead pins as a vibration propagation destination obtain the propagating vibration energy and resonantly vibrate, a vibration width of the lead pins can be maximized.

In a case where wire bonding has performed in advance with respect to the lead pins as the vibration propagation destination, a bonding portion strongly vibrates due to the resonance of the lead pins. Typically, bonding is performed under conditions capable of attaining connection strength having a sufficient design tolerance with respect to limit connection strength so that sufficient connection strength can be maintained even when slight vibration or impact is applied. According to this, even when vibration is applied to the lead pins as described above, connection reliability is less likely to immediately deteriorate.

However, in a case where vibration is intermittently applied from a plurality of other lead pins, and in a case where the vibration energy is not attenuated so much and propagates, the original connection strength may deteriorate. In recent years, a pin interval is short or a pin formed unit interval is short in accordance with trend of miniaturization of the housing, and thus the vibration energy is not attenuated so much, and is likely to propagate to other lead pins.

Figure 6:
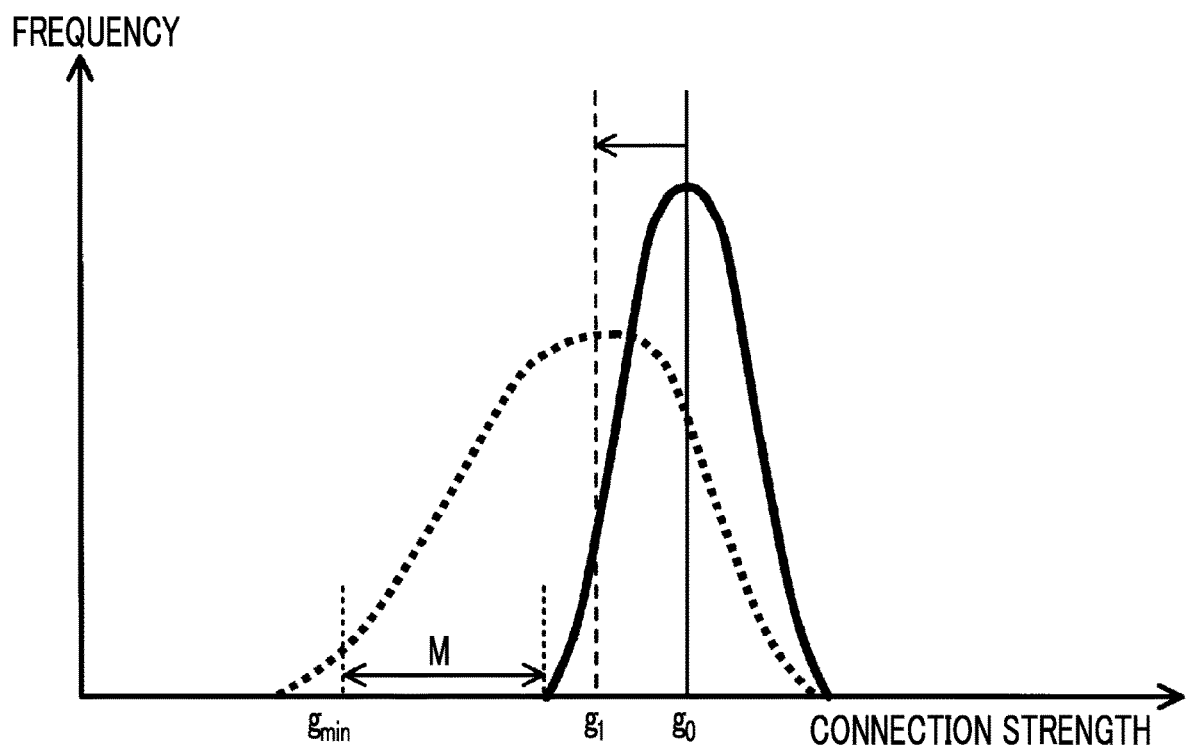
FIG. 6 is a view illustrating deterioration of wire connection strength due to propagation of vibration.

FIG. 6 is a graph illustrating a possibility that wire connection strength decreases due to propagation of vibration and thus a variation of the connection strength may increase. In the graph in FIG. 6, the horizontal axis represents the connection strength of a wire, and the vertical axis represents appearance frequency thereof. In addition, a distribution of the original connection strength is illustrated with a solid-line curve, and a distribution of connection strength that decreases due to propagation of vibration is illustrated with a broken-line curve. In addition, $g_0$ represents an average value of the original connection strength, $g_1$ represents an average value of connection strength that decreases due to propagation of vibration, $g_{min}$ represents necessary minimum limit connection strength of a bonded wire, and M represents a design tolerance with respect to the limit connection strength $g_{min}$.

As illustrated in FIG. 6, the original average connection strength $g_0$ decreases to the average connection strength $g_1$ due to propagation of vibration, and spreading of connection strength distribution also increases. Accordingly, although sufficient connection strength is originally provided with respect to the limit connection strength $g_{min}$, the connection strength may be less than the limit connection strength $g_{min}$ in a statistical connection strength distribution.

This phenomenon is considered as a mechanism in which even when performing wire bonding under the same bonding conditions in a state in which a material or a shape of a lead pin that is subjected to the wire bonding, a housing fixing configuration, a using apparatus, and the like are the same in each case, bonding having strength lower than the limit connection strength occurs.

That is, even in wire bonding in which the above-described various factors are set to be the same in each case, if the housing is miniaturized and a pin interval or a pin formed unit interval is changed, connection strength of bonding provided in advance may vary due to propagation of vibration.

Figure 7:
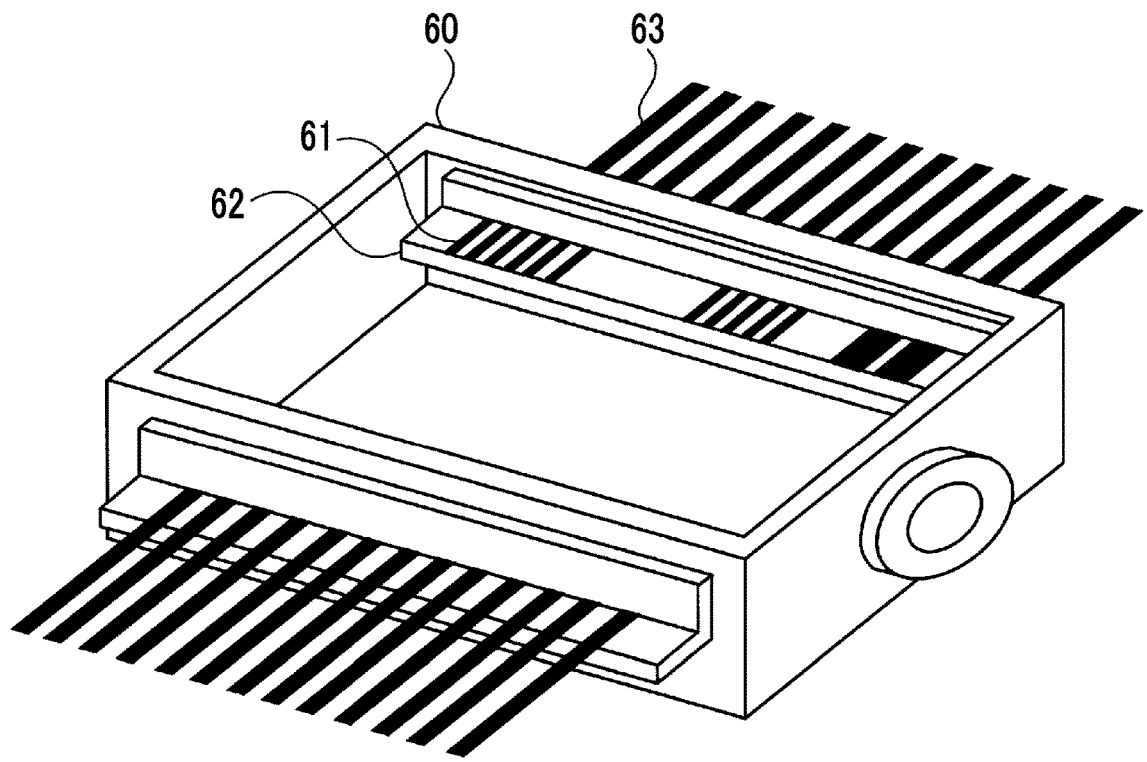
FIG. 7 is a view illustrating an example of a butterfly pin configuration of a semiconductor LD housing.

FIG. 7 illustrates an example of a butterfly pin configuration of a semiconductor LD housing. A semiconductor LD housing 60 in the same drawing is also a small-sized housing including a plurality of lead pins 63. As a bonding connection portion, a pad portion 61 inside the housing is patterned on a ceramic substrate 62, and the lead pins 63 exist only at the outside of the housing. Wire bonding on an inner side is performed with respect to the pad portion 61 on the ceramic substrate 62. Accordingly, the above-described resonance does not occur, and a problem related to wire bonding having strength lower than the limit strength does not occur.

In addition, as illustrated in FIG. 7, a configuration of forming a pad portion (bonding connection portion) on the ceramic substrate provided inside the housing is not used in an optical element such as the DP-QPSK modulator from the viewpoints of reliability due to a difference in a thermal expansion coefficient, a cost, and the like.

Here, a natural frequency f (Hz) due to vertical vibration of the lead pins can be calculated as follows (Expression 1). Furthermore, λ represents a constant that is determined from boundary conditions and a vibration mode, L represents a length of the lead pins, E represents a vertical elastic coefficient (Young's modulus) of a material of the lead pins, and ρ represents a mass per unit volume of the material of the lead pins.

$$f = \lambda/2\pi L \cdot \sqrt{(E/\rho)} \quad \text{(Expression 1)}$$

For example, in a case of using a lead pin in which Fe (E=200×10⁹ N/m², ρ=7.83×10⁶ kg/m³) is set as a material, a cross-sectional shape is set to a square shape (width: 0.35 mm), and a length is set to 0.8×10⁻³ mm, vertical vibration of 50 kHz, 150 kHz, 250 kHz, and the like occurs. In addition, in a case of using a lead pin having a length of 1.7×10⁻³ mm under the same conditions, vertical vibration of 23.5 kHz, 70.6 kHz, 117.6 kHz, and the like occurs. A vibration frequency that is applied by a wire bonding apparatus is approximately 30 kHz to 200 kHz, and a natural frequency of the lead pin is included in the vibration frequency. Accordingly, it can be seen that resonance of the lead pin is induced due to application of ultrasonic waves by the wire bonding apparatus, and thus there is a possibility that a bonding failure with connection strength lower than the limit connection strength $g_{min}$ may occur.

In the invention, an optical modulator is configured as follows so as to solve the above-described problem.

Specifically, for example, as illustrated in FIG. 8 to FIG. 14, in an optical modulator in which an optical modulation element 12 is accommodated in a housing 11, a plurality of lead pins 14, which are electrically connected to the optical modulation element 12 through wire bonding, are fixed to the housing 11 in a manner of protruding at least a part of each of the plurality of lead pins 14 into the housing 11. The plurality of lead pins 14 are configured in such a manner that a natural frequency of at least a part of the lead pins 14 is different from that of the other lead pins 14.

Hereinafter, description will be given of the optical modulator of the invention with reference to examples.

FIRST EXAMPLE

Figure 8:
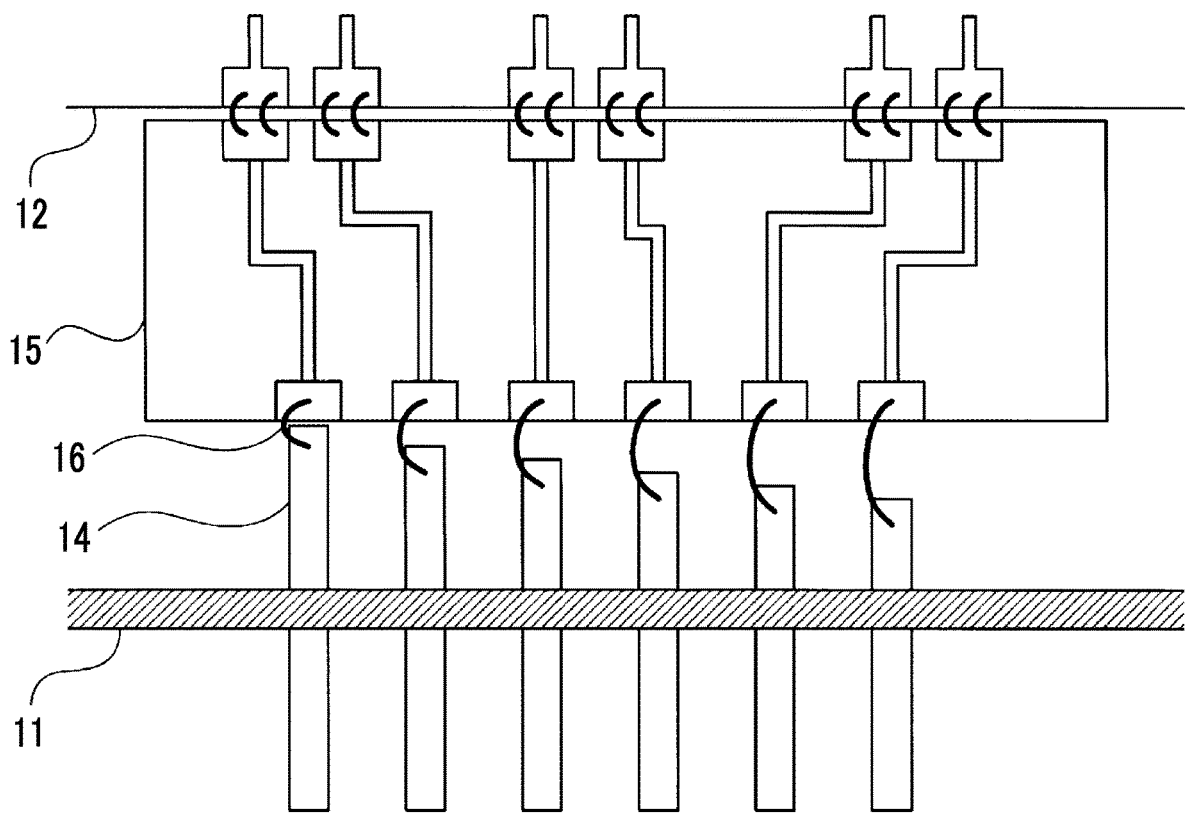
FIG. 8 is a view illustrating a lead pin structure according to a first example of the invention.

FIG. 8 is a view illustrating a lead pin structure according to a first example of the invention. Here, it is assumed that lead pins which are formed by using an Fe—Ni—Co alloy as a material and have a pin width of 0.35 mm, are arranged at an interval of 1.27 mm. According to the first example, in a configuration in which a plurality of lead pins 14 are fixed to the housing 11 in a manner of protruding at least apart of each of the plurality of lead pins 14 into the housing 11, an in-housing pin length (a length of a portion, which protrudes into the housing, of the lead pins 14) is set to be different in the entirety of lead pins. That is, the first example has a configuration in which natural frequencies, which are derived from the in-housing pin length of the respective lead pins, are set to be different from each other. According to this configuration, a resonance frequency or a vibration state, which occurs due to execution of wire bonding, is different in each pin. Accordingly, even when vibration energy propagates to bonded lead pins from other lead pins, resonance is less likely to occur. According to this configuration, there is a demerit that the kind of lead pins increases, the number of housing manufacturing processes increases, and the like, but a very high effect is exhibited against deterioration of connection strength in the wire bonding due to propagation of vibration.

Here, as illustrated in FIG. 8, in a case of a structure in which the in-housing pin length of the respective lead pins varies (increases or decreases) by a predetermined width in accordance with arrangement of the lead pins, a relay substrate 15 may be formed in a shape corresponding to the variation. That is, for example, a relay substrate having a trapezoidal shape may be used so that an interval between a tip end portion of the lead pins and an opposite pad portion on the relay substrate becomes constant in each lead pin. According to this, it is possible to make a bonding length of the respective lead pins constant.

SECOND EXAMPLE

Figure 9:
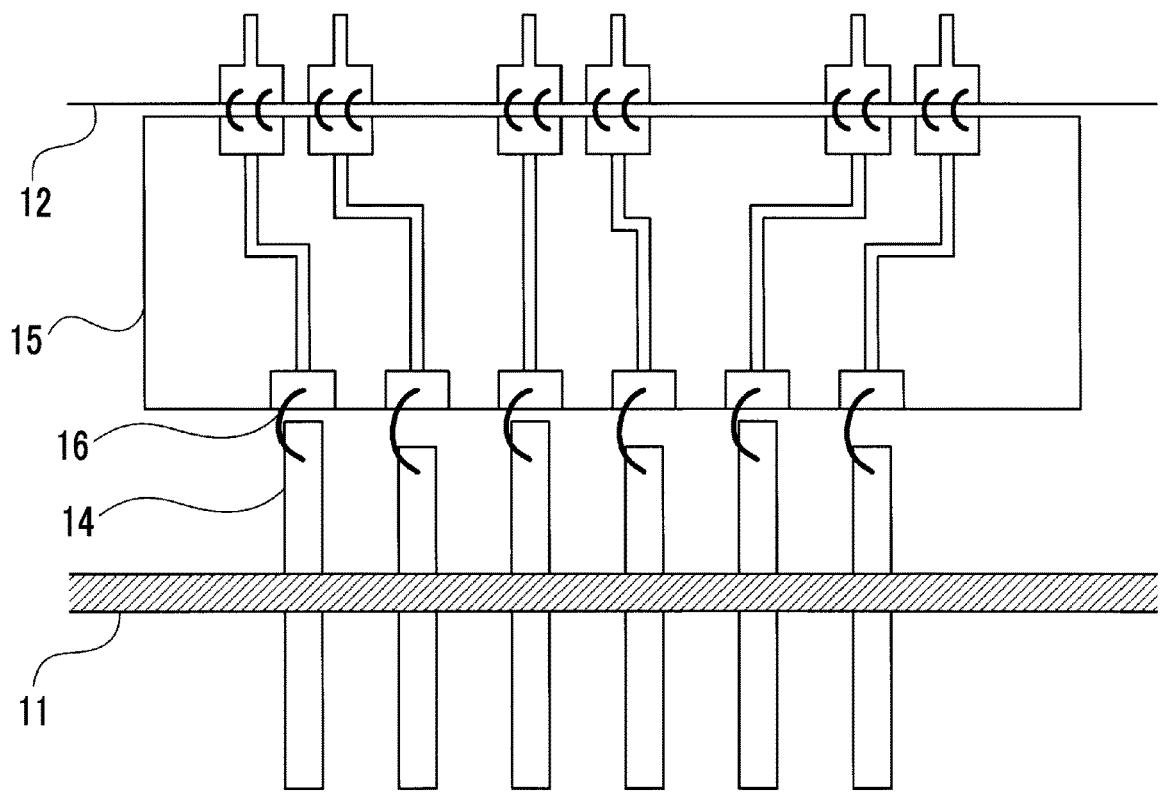
FIG. 9 is a view illustrating a lead pin structure according to a second example of the invention.

FIG. 9 is a view illustrating a lead pin structure according to a second example of the invention.

According to the second example, in the configuration in which the plurality of lead pins 14 are fixed to the housing 11 in a manner of protruding at least a part of each of the plurality of lead pins 14 into the housing 11, the in-housing pin length is set to be different between lead pins 14 adjacent to each other. In this case, differently from the first example in which the in-housing pin length of the entirety of the lead pins is set to be different in each case, only two kinds of the lead pins are necessary. According to this configuration, a resonance frequency (natural frequency) is different between the closest lead pins on which an influence of vibration is the greatest, and thus a very high effect is exhibited against connection strength deterioration in the wire bonding due to propagation of vibration.

In addition, the first example (FIG. 8) represents an example in which the in-housing pin length is different in each pin, and the second example (FIG. 9) represents an example in which the in-housing pin length is alternately different. However, it is needless to say that the same effect is attained if the in-housing pin length of at least partial lead pins among the plurality of lead pins is different from that of the other lead pins.

THIRD EXAMPLE

Figure 10:
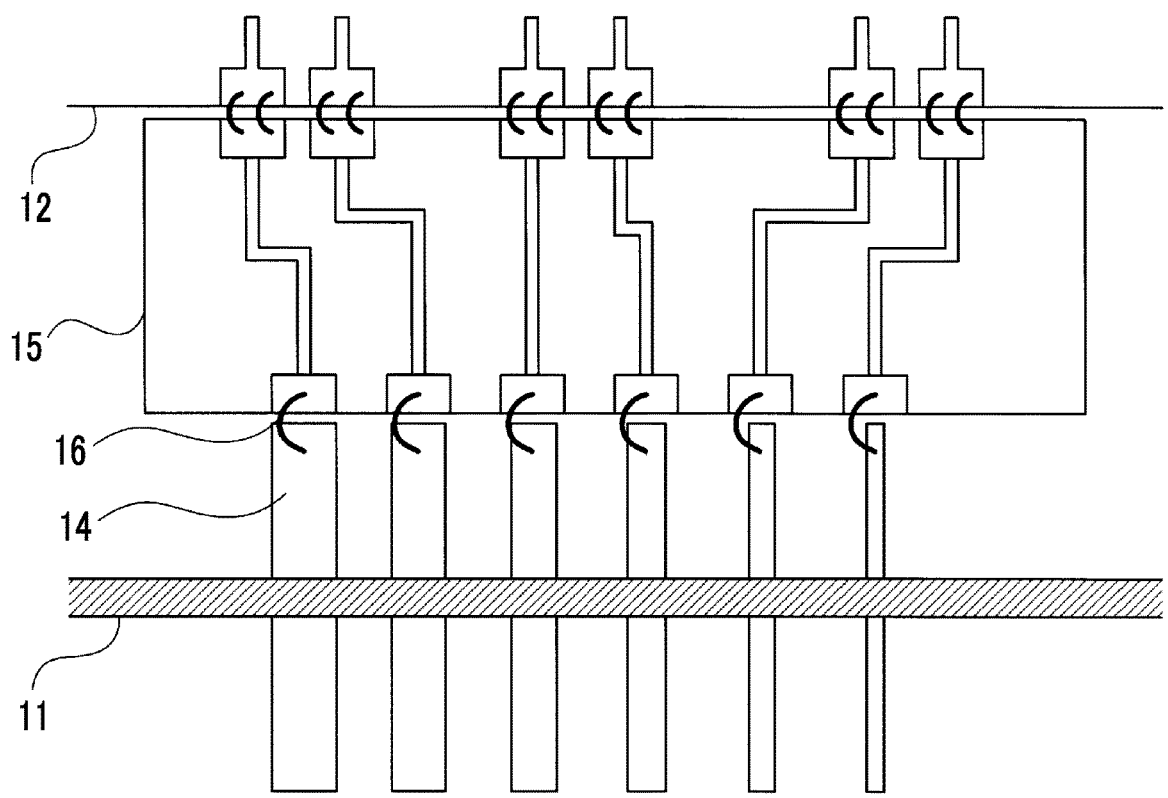
FIG. 10 is a view illustrating a lead pin structure according to a third example of the invention.

FIG. 10 is a view illustrating a lead pin structure according to a third example of the invention. According to the third example, in the configuration in which the plurality of lead pins 14 are fixed to the housing 11 in a manner of protruding at least a part of each of the plurality of lead pins 14 into the housing 11, a width or a boldness is set to be different in each of the lead pins 14. Even in a case of changing not only the length of the lead pins but also the width or the boldness, the natural frequency of the lead pins may be set to a value different in each lead pin. Generally, when the length of the lead pins is constant, if the width of the lead pins increases (or if the lead pins become bold), the natural frequency becomes higher. In contrast, if the width of the lead pins decreases (or if the lead pins become thin), the natural frequency becomes lower. According to this, dispersion or adjustment of the resonance frequency can be also performed by changing the width or the boldness of the lead pins. Furthermore, although not illustrated, the thickness of the lead pins may be changed, and according to this, it is possible to perform dispersion or adjustment of the resonance frequency.

FOURTH EXAMPLE

Figure 11:
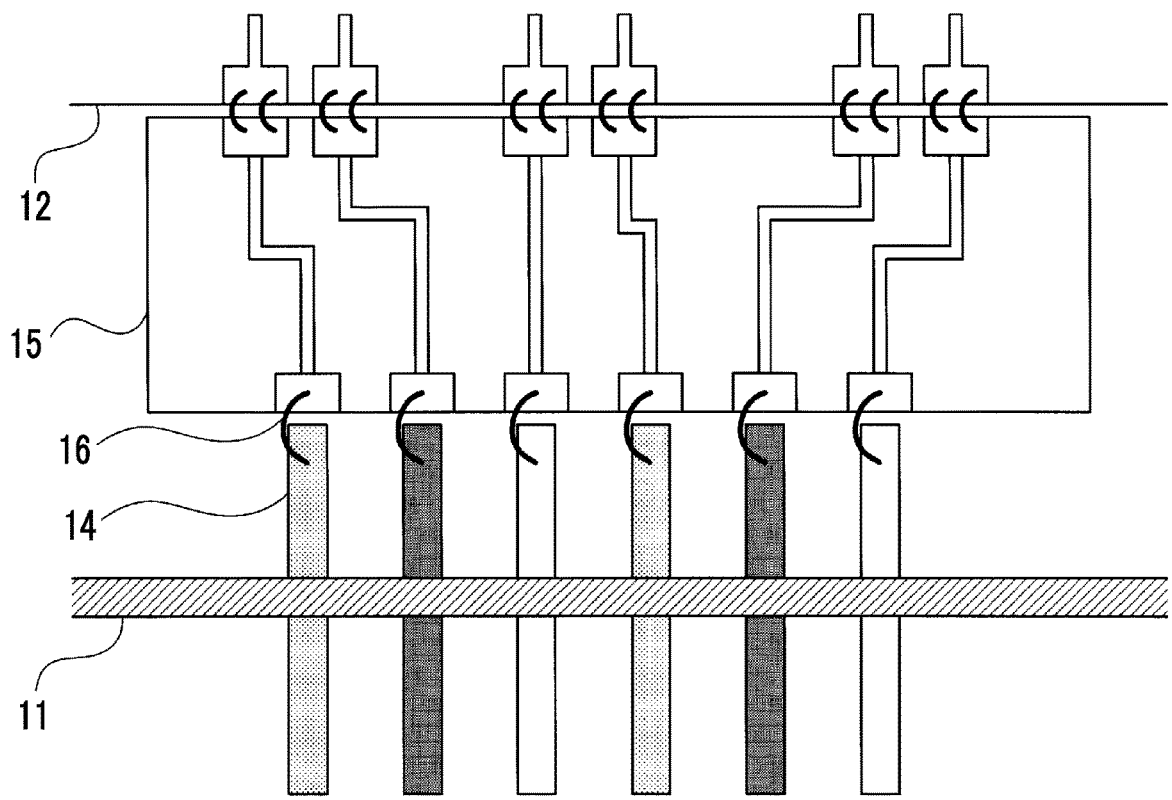
FIG. 11 is a view illustrating a lead pin structure according to a fourth example of the invention.

FIG. 11 is a view illustrating a lead pin structure according to a fourth example of the invention.

According to the fourth example, in the configuration in which the plurality of lead pins 14 are fixed to the housing 11 in a manner of protruding at least apart of each of the plurality of lead pins 14 into the housing 11, a material is set to be different between at least adjacent lead pins 14.

According to this configuration, it is also possible to perform dispersion or adjustment of the natural frequency of the lead pins. As a material of the lead pins, for example, materials such as brass and an Fe—Ni—Co alloy are used. Densities or elastic coefficients of respective metals are different from each other, and thus the natural frequency is different even in lead pins designed in the same shape. In addition, even in lead pins using the same Fe—Ni—Co alloy, when a mixing ratio of Fe, Ni, or the like in the alloy is different, the natural frequency of the lead pins varies. That is, even in the lead pins prepared by using the same composite material, it is possible to change the natural frequency of the lead pins by making a mixing ratio of respective materials different.

FIFTH EXAMPLE

Figure 12:
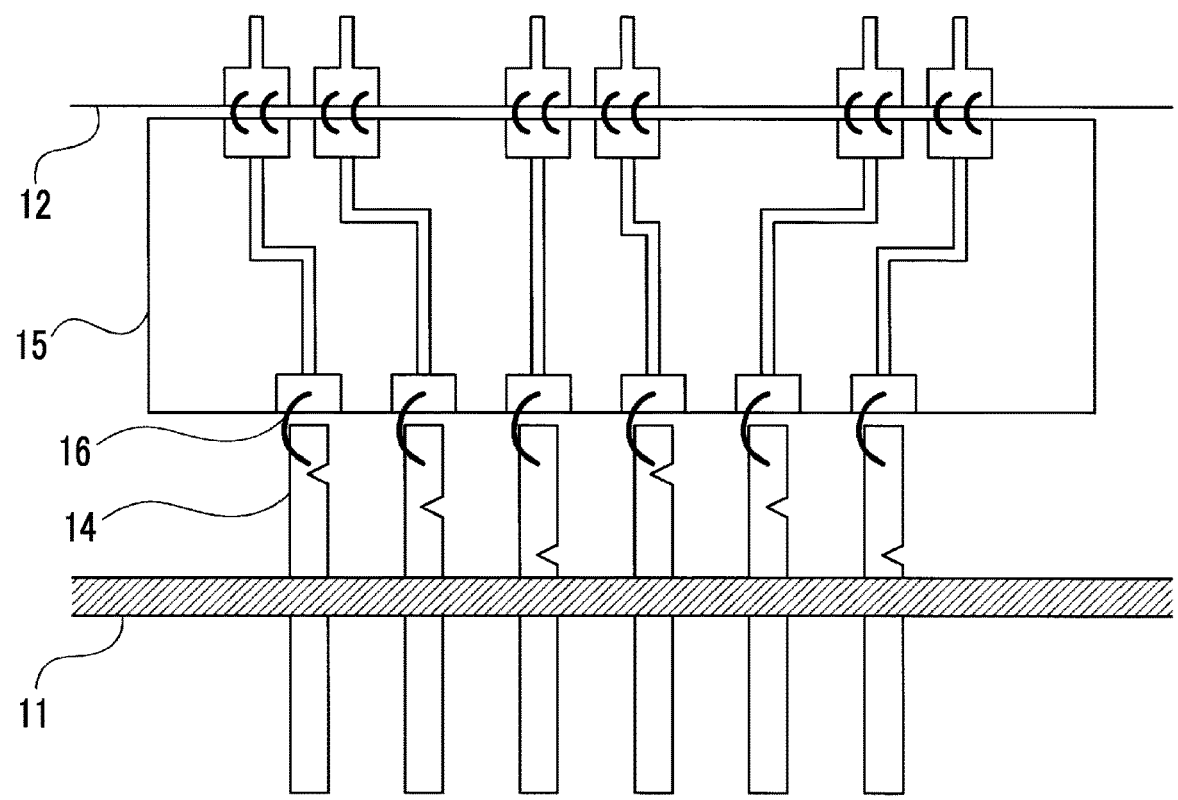
FIG. 12 is a view illustrating a lead pin structure according to a fifth example of the invention.

FIG. 12 is a view illustrating a lead pin structure according to a fifth example of the invention.

According to the fifth example, in the configuration in which the plurality of lead pins 14 are fixed to the housing 11 in a manner of protruding at least apart of each of the plurality of lead pins 14 into the housing 11, at least a part of the lead pins 14 is processed so that a shape locally varies. Processing with respect to the lead pins can be relatively easily performed by a method such as cutting and etching. According to the processing, the natural frequency of the lead pins varies, and thus it is possible to reduce an influence due to vibration that occurs during bonding. In this case, when a position (position at which a shape locally varies) of the processing, which is performed with respect to the lead pins, is set to be different in at least partial lead pins, it is possible to change the natural frequency of the lead pins, and thus this configuration is more effective.

Furthermore, the fifth example (FIG. 12) illustrates an example in which processing is performed with respect to the entirety of the lead pins, but it is needless to say that processed lead pins and non-processed lead pins may be mixed-in with each other.

SIXTH EXAMPLE

Figure 13:
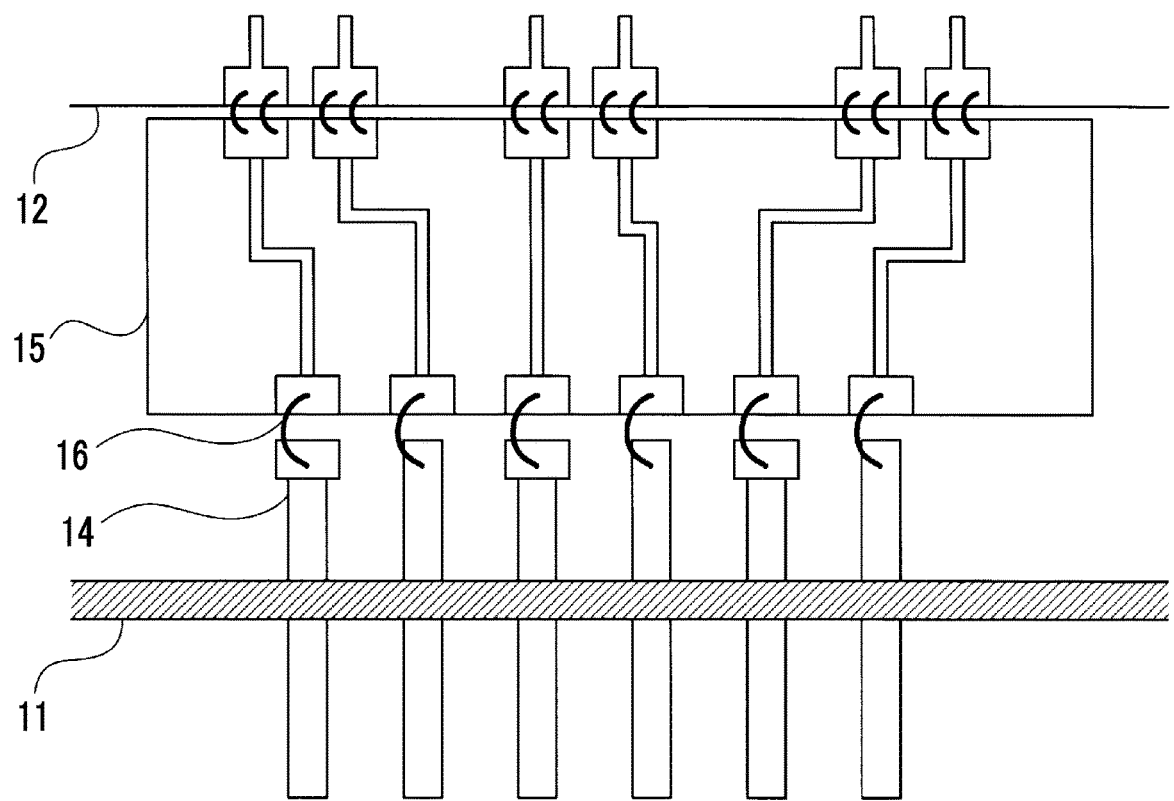
FIG. 13 is a view illustrating a lead pin structure according to a sixth example of the invention.

FIG. 13 is a view illustrating a lead pin structure according to a sixth example of the invention.

According to the sixth example, in the configuration in which the plurality of lead pins 14 are fixed to the housing 11 in a manner of protruding at least apart of each of the plurality of lead pins 14 into the housing 11, a tip end of partial lead pins 14 is processed so that a bonding effective area is enlarged. In three lead pins of which the tip end is processed, the moment of inertia of the lead pins or a vibration propagation situation during ultrasonic bonding varies in comparison to non-processed lead pins, and thus it is possible to allow a resonance frequency of the lead pins to vary. This processing can be easily realized through compression deformation and the like, and it is possible to easily change the shape of the pin tip end in accordance with the magnitude of compression, and thus it is possible to effectively diffuse the resonance frequency, and it is possible to realize the processing at a low manufacturing cost.

Furthermore, the sixth example (FIG. 13) also represents an example in which lead pins of which the tip end is processed and non-processed lead pins are alternately arranged, but the processing may be performed with respect to the entirety of the lead pins. In this case, the degree of processing may be set to be different between at least adjacent lead pins.

SEVENTH EXAMPLE

Figure 14:
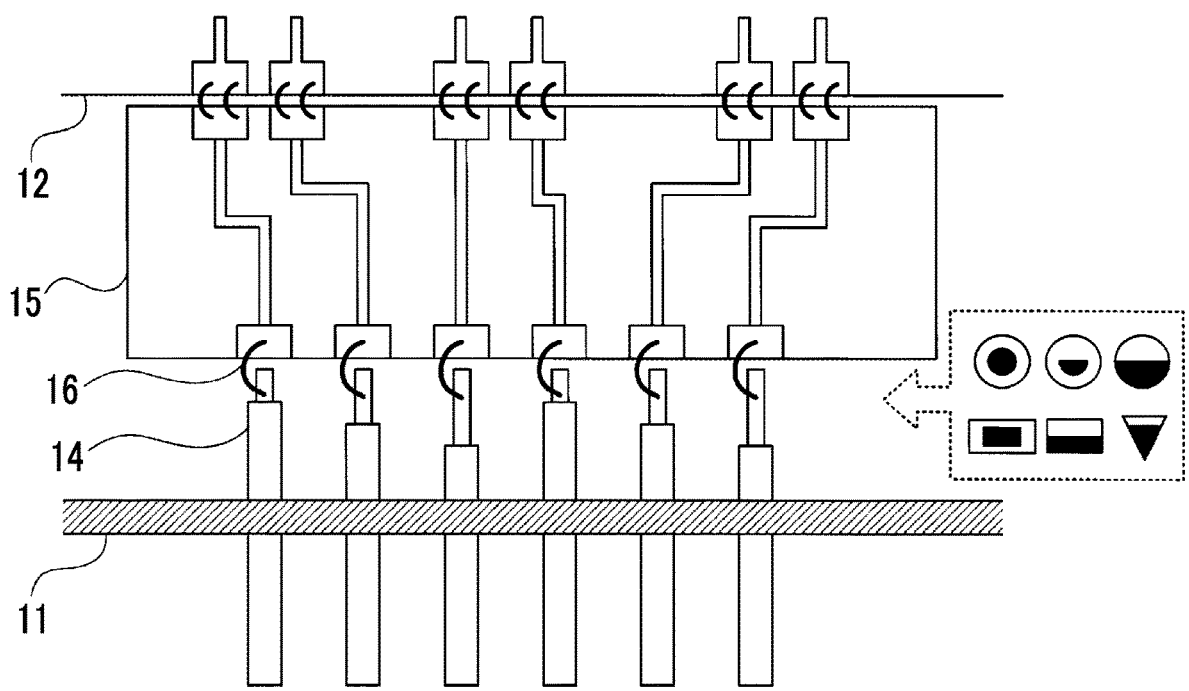
FIG. 14 is a view illustrating a lead pin structure according to a seventh example of the invention.

FIG. 14 is a view illustrating a lead pin structure according to a seventh example of the invention.

According to the seventh example, in the configuration in which the plurality of lead pins 14 are fixed to the housing 11 in a manner of protruding at least a part of each of the plurality of lead pins 14 into the housing 11, a portion of which a width or a boldness is changed is provided on a tip end side of the respective lead pins 14, and a length of the portion is set to be different between at least adjacent lead pins 14. As described above, when the lead pins are processed to change the natural frequency (resonance frequency), and the processing length is further changed, it is possible to attain a variation width of the natural frequency in a more widespread manner. Accordingly, this configuration is more effective against deterioration of connection strength in wire bonding due to propagation of vibration.

Furthermore, in the above-described examples, description has been given of an example in which a cross-sectional shape of the lead pins is a circular shape or a rectangular shape, but there is no limitation to the shapes. As illustrated in a broken-line frame in FIG. 14 as other examples, the cross-sectional shape can be set to various shapes (for example, a trapezoidal shape, an elliptical shape, a triangular shape). In addition, the natural frequency also varies in accordance with the cross-sectional shape of the lead pins, and thus lead pins of which cross-sectional shapes are different from each other may be used.

In addition, according to the above-described examples, in the lead pins, at least one of the length, the boldness, the width, the thickness, the cross-sectional shape, the material, and the position at which the shape locally varies is adjusted to make the natural frequency different between partial lead pins and the other lead pins. Furthermore, the examples are illustrative only, and the natural frequency of the lead pins may be adjusted by the other methods.

In addition, it is ideal that the natural frequency is set to be different between the entirety of the lead pins. However, even in a case where the natural frequency is set to be different only between partial lead pins and the other lead pins, it is effective to suppress deterioration of connection strength in wire bonding. However, it is preferable that the natural frequency is set to be different between at least adjacent lead pins from the viewpoint of attaining an effect of suppressing deterioration of the connection strength in the wire bonding with respect to the entirety of lead pins.

In addition, in the above-described examples, a structure in which respective lead pins are arranged at even intervals (interval of 1.27 mm), but the respective lead pins may be arranged in approximately even intervals. Furthermore, the "approximately even intervals" represents that a difference between respective intervals is in a predetermined range (for example, a range not deteriorating wire bonding).

In addition, it is not necessary for the entirety of the lead pins to be arranged in approximately even intervals, and an interval between partial lead pins may be wide. In this case, vibration does not propagate so much between distant lead pins, and thus it is preferable to make the natural frequency different between adjacent lead pins instead of making the natural frequency different between the distant lead pins. In addition, it is assumed that the narrower the interval between the lead pins is, the further propagation strength of vibration increases. Accordingly, application of the invention is effective in an optical modulator having a structure in which the lead pins are arranged in a relatively denser manner.

Here, the above-described examples have a configuration in which a resonance countermeasure is made on individual lead pins, but there is a demand for a method of suppressing deterioration of connection strength in wire bonding in a more simple configuration from the viewpoints of manufacturing easiness, and balance between the production cost and required reliability.

Examples of a configuration in which a plurality of lead pins are arranged include a configuration in which the entirety of the lead pins are arranged at approximately even intervals, and a configuration in which the lead pins are integrated to form a unit for every plurality of lead pins, and a plurality of units are arranged at an interval wider than an interval between the lead pins in one unit. With regard to the unit of the lead pins, for example, a structure in which a plurality of lead pins are unitized through glass sealing in a state of being arranged is used. In the example of the related art as illustrated in FIG. 1, a unitized pin configuration of the latter case is exemplified (the butterfly pin configuration in FIG. 7 is an example of the former case), but the in-housing pin length is the same in each of the lead pins. Hereinafter, description will be given of a resonance countermeasure on a configuration in which lead pins are used in a unitized state with reference to examples.

EIGHTH EXAMPLE

Figure 15:
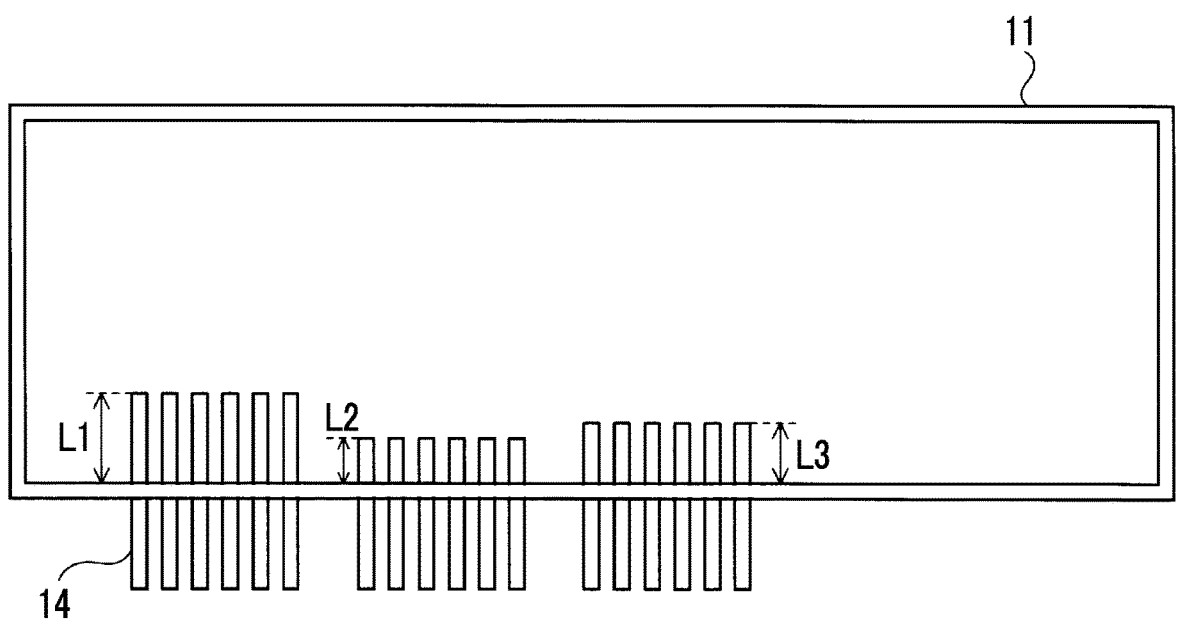
FIG. 15 is a view illustrating a lead pin structure according to an eighth example of the invention.

FIG. 15 is a view illustrating a lead pin structure according to an eighth example of the invention. Furthermore, in FIG. 15 (and in FIG. 16 and FIG. 17), only a housing and lead pins are illustrated, and other configuration elements are omitted. According to the eighth example, in a configuration in which a plurality of units, in which the lead pins 14 fixed to the housing 11 in a manner of protruding at least a part of each of the lead pins into the housing 11 are unitized for every plurality of lead pins, are arranged, an in-housing pin length of at least partial units is set to be different from that of the other units. Specifically, in a case where an in-housing pin length of a left unit is set to L1, an in-housing pin length of the central unit is set to L2, and an in-housing pin length of a right unit is set to L3, setting is performed to satisfy a relationship of L1>L3>L2.

As described above, when a plurality of lead pins which are continuously arranged are handled in a unitized manner, working of arranging the lead pin to the housing is simplified, and thus it is possible to enhance manufacturing easiness. In addition, the natural frequency (resonance frequency) of the lead pins can be set to be different between units. Accordingly, although not higher than the effect of suppressing deterioration of connection strength in a case of changing the resonance frequency of individual lead pins, it is possible to attain an effect of suppressing deterioration of connection strength due to vibration from other units.

The configuration of the eighth example is effective for a case of also desiring to secure manufacturing easiness in a case where design tolerance with respect to limit connection strength is high, and the like. Furthermore, this example illustrates an example in which the number of units is set to three, and the in-housing pin length is set to be different between the units. However, the number of units is not limited to three, and it is not necessary to change the in-housing pin length in the entirety of the units. Even in a case where the in-housing pin length of at least one unit is set to be different only from that of the other units, the effect is attained, and it is preferable to make the in-housing pin length different between at least adjacent units. That is, for example, a configuration satisfying a relationship of L1=L3>L2 may be employed.

NINTH EXAMPLE

Figure 16:
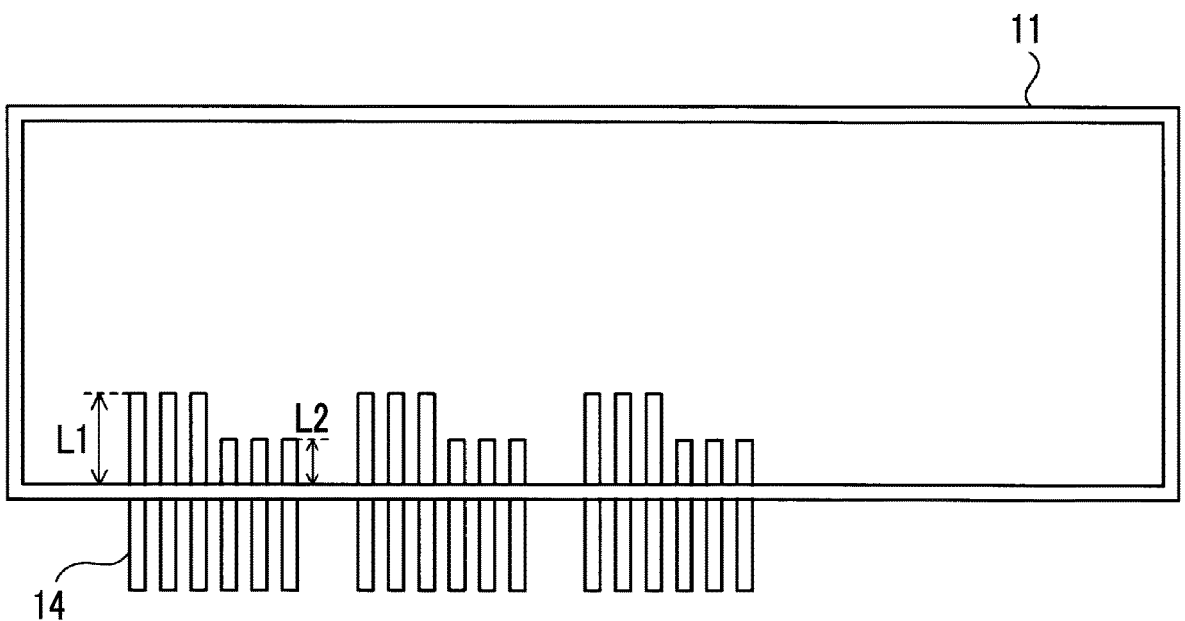
FIG. 16 is a view illustrating a lead pin structure according to a ninth example of the invention.

FIG. 16 is a view illustrating a lead pin structure according to a ninth example of the invention.

According to the ninth example, in the configuration in which the plurality of units, in which the lead pins 14 fixed to the housing 11 in a manner of protruding at least a part of each of the lead pins 14 into the housing 11 are unitized for every plurality of lead pins, are arranged, the in-housing pin length of at least partial lead pins in one unit is set to be different from that of the other lead pins in the unit. Specifically, in a case where each of the units includes six lead pins, an in-housing pin length of three lead pins on a left side in the unit is set to L1, an in-housing pin length of three lead pins on a right side is set to L2, setting is performed to satisfy a relationship of L1>L2. According to this, lead pins different in the natural frequency are mixed in one unit.

In the configuration, it is possible to manufacture and assemble respective units in the same design, and thus the configuration is advantageous from the viewpoints of manufacturing easiness and the cost. At this time, it is more effective to make the in-housing pin length different between lead pins adjacent to each other between respective units (for example, a right-end lead pin of a left unit and a left-end lead pin of a right unit).

Here, the eighth and ninth examples illustrate an example in which the length of the lead pins is adjusted so as to make the natural frequency of the lead pins different between units or in the same unit. Furthermore, this example is illustrative only, and it is possible to make the natural frequency of the lead pins different between units or in the same unit in accordance with other various methods as illustrated in the first to seventh examples.

TENTH EXAMPLE

Figure 17:
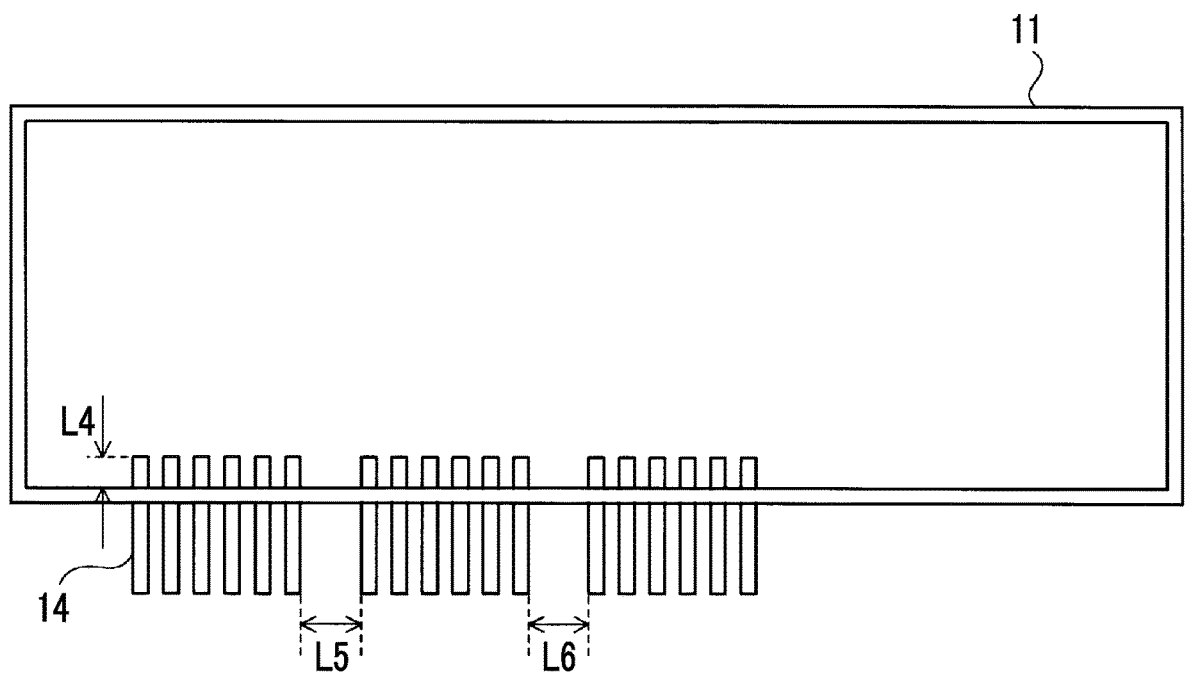
FIG. 17 is a view illustrating a lead pin structure according to a tenth example of the invention.

FIG. 17 is a view illustrating a lead pin structure according to a tenth example of the invention. According to the tenth example, in the configuration in which the plurality of units, in which the lead pins 14 fixed to the housing 11 in a manner of protruding at least a part of each of the lead pins 14 into the housing 11 are unitized for every plurality of lead pins, are arranged, an in-housing pin length of the respective lead pins is set to be shorter than an interval between the units. In other words, the interval between the units is set to be longer than the in-housing pin length of the respective lead pins. Specifically, in a structure in which three units arranged in parallel to each other, in a case where the in-housing pin length is set to L4, an interval between a left unit and the central unit is set to L5, and an interval between the central unit and a right unit is set to L6, setting is performed to satisfy a relationship of L4<L5, and a relationship of L4<L6. In addition, L5 may be equal to L6.

Vibration, which occurs in lead pins during wire bonding, propagates to other lead pins through a housing lateral surface and has an effect on the other lead pins. At this time, the vibration propagates while being scattered in an approximately two-dimensional manner with a fixing end (connection portion with the housing) of the lead pins set as a point source of waves. According to this, an influence due to propagation of vibration energy attenuates in proportional to the square of a distance between lead pins. In a housing in which the number of lead pins is small, or an interval between lead pins or an interval between units is wide, the reason for a phenomenon, in which limit connection strength is less in comparison to set conditions, is not significant can be estimated as follows. That is, attenuation of the vibration energy makes a great contribution.

In addition, when vibration, which occurs in the lead pins during wire bonding, propagates through the housing lateral surface to which the lead pins are fixed, the vibration propagates in a state in which a wavelength thereof is shortened (a frequency is raised) due to a structure difference in addition to a density or an elastic coefficient of a material. The reason for this is because lead pins having an elongated structure in which at least a part of each of the lead pins is protruded into the housing are likely to vibrate. In contrast, the housing is thick, and thus the housing can be effectively considered as both infinity fixing ends.

Accordingly, when providing respective units at an interval longer than a vibration wavelength, that is, when setting the in-housing pin length to attain a resonance wavelength shorter than a unit interval, it is possible to effectively use the effect in which vibration energy is attenuated in proportional to the square of a distance. According to this, it is possible to suppress deterioration of connection strength in wire bonding. According to the above-described configuration, respective units can be manufactured and assembled in the same design in a case where the in-housing pin length can be designed to be short, in a case where the interval between the units can be designed to be wide, and the like, and the configuration is particularly effective for the cases.

Furthermore, the configurations exemplified in the first to ninth examples can be combined with the configuration of the tenth example. According to this, it is possible to more effectively suppress deterioration of connection strength in wire bonding.

Figure 18:
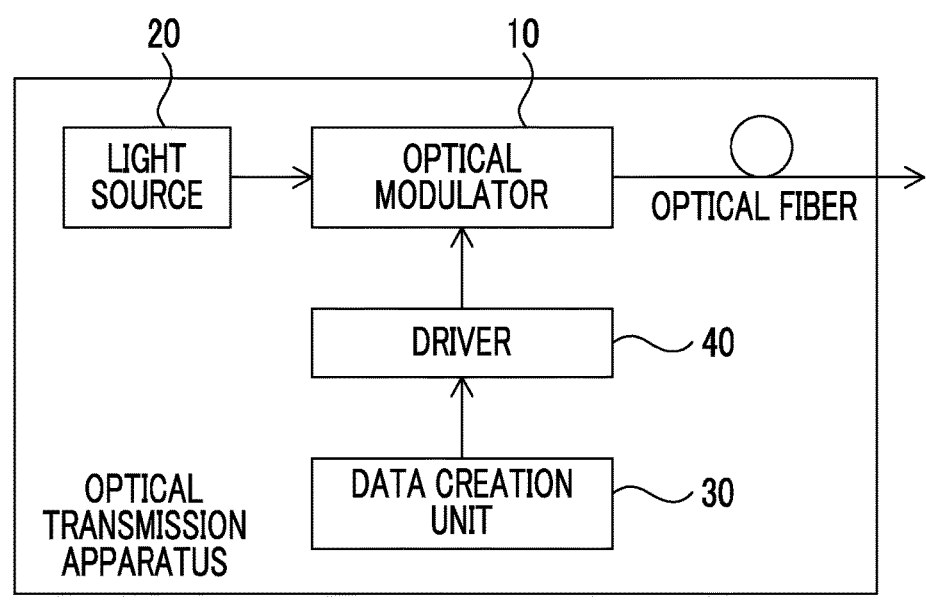
FIG. 18 is a block diagram illustrating a configuration example of an optical transmission apparatus on which the optical modulator of the invention is mounted.

FIG. 18 is a block diagram illustrating a configuration example of an optical transmission apparatus on which the optical modulator according to the invention is mounted. The optical transmission apparatus includes alight source 20, a data creation unit 30, a driver 40, and the like in addition to an optical modulator 10. As the optical modulator 10, optical modulators having the lead pin structures described in the respective examples are used. The data creation unit 30 creates signal data that is transmitted from the optical transmission apparatus, and inputs the signal data to the driver 40. The driver 40 amplifies the input signal data to create a high-frequency signal having a waveform corresponding to the signal data. The high-frequency signal that is created by the driver 40 is input to an RF input unit of the optical modulator 10 through an external circuit substrate.

In addition to the RF input unit, the optical modulator 10 includes a plurality of lead pins as a signal input unit for a bias control of a plurality of optical modulator units formed on an optical modulation element, or as an output unit of a monitor PD (photo detector) that generates an electrical signal that is used for the bias control. For example, as a DP-QPSK modulator in which four RF input units, four optical modulator units, and two monitor PDs for feedback are integrated, a DP-QPSK, which includes 18 lead pins including a ground pin or a not connect (NC) pin, is known. The respective lead pins are fixed and connected to a bias control circuit and the like, which are provided in the optical transmission apparatus, by using solder and the like, and a DC voltage or a low-frequency electrical signal is applied to the respective lead pins. The respective lead pins are set so that transmission characteristics of the optical transmission apparatus can be operated in a satisfactory and stable manner.

As described above, according to the invention, even in a case of using an optical modulator having a lead pin configuration capable of being air-tightly sealed at a relatively low cost, it is possible to provide a small-size and high-reliability optical modulator. In addition, when mounting the optical modulator according to the invention on the optical transmission apparatus, it is possible to provide a high-reliability optical transmission apparatus.

Here, in the above-described examples, LN is used in a substrate of the optical modulation element, but substrates using other materials may be used. In addition, in the above-described examples, description has been given of a case where four high-frequency signal electrodes are provided as an example, but there is no limitation to the number. In addition, although not specifically illustrated, it is needless to say that it is possible to employ a configuration in combination of several configurations illustrated in the examples.

The invention can be used in an optical modulator having a structure including a plurality of lead pins which are fixed to a housing in a manner of protruding at least a part of each of the plurality of lead pins into the housing.

What is claimed is:

1. An optical modulator comprising:
an optical modulation element that is accommodated in a housing,
wherein the optical modulation element is fixed to a bottom surface of the housing, the housing has at least one sidewall extending perpendicularly to the bottom surface, a plurality of cantilevered lead pins are fixed to the sidewall of the housing in a manner of protruding at least a part of each of the plurality of cantilevered lead pins to the inside of the housing,
the cantilevered lead pins have side surfaces and end surfaces,
the cantilevered lead pins are electrically connected to the optical modulation element through wire bonding of which one end of a wire is connected to a portion of the side surface of the cantilevered lead pin near the end surface of the open end of the cantilevered lead pin and the other end of the wire is connected to the optical modulation element, and
a natural frequency of at least partial cantilevered lead pins among the plurality of cantilevered lead pins is different from a natural frequency of the other cantilevered lead pins by the partial cantilevered lead pins being different from the other cantilevered lead pins in at least one of a length, a boldness, a width, a thickness, a cross-sectional shape, a material, and a position at which a shape locally varies.

2. The optical modulator according to claim 1, wherein the plurality of cantilevered lead pins are arranged at approximately even intervals, and a natural frequency is different between at least adjacent cantilevered lead pins.

3. The optical modulator according to claim 1, wherein among the plurality of cantilevered lead pins, a plurality of cantilevered lead pins which are continuously arranged are integrated to form a unit, an interval between respective units is greater than an interval between cantilevered lead pins in one unit, and a natural frequency of cantilevered lead pins in at least partial units is different from a natural frequency of cantilevered lead pins in other units, or a natural frequency of at least partial cantilevered lead pins in one unit is different from a natural frequency of the other cantilevered lead pins in the unit.

* * * * *